(No Model.)
J. J. ANTHONY.
SPITTOON LIFTER.
No. 305,653. Patented Sept. 23, 1884.
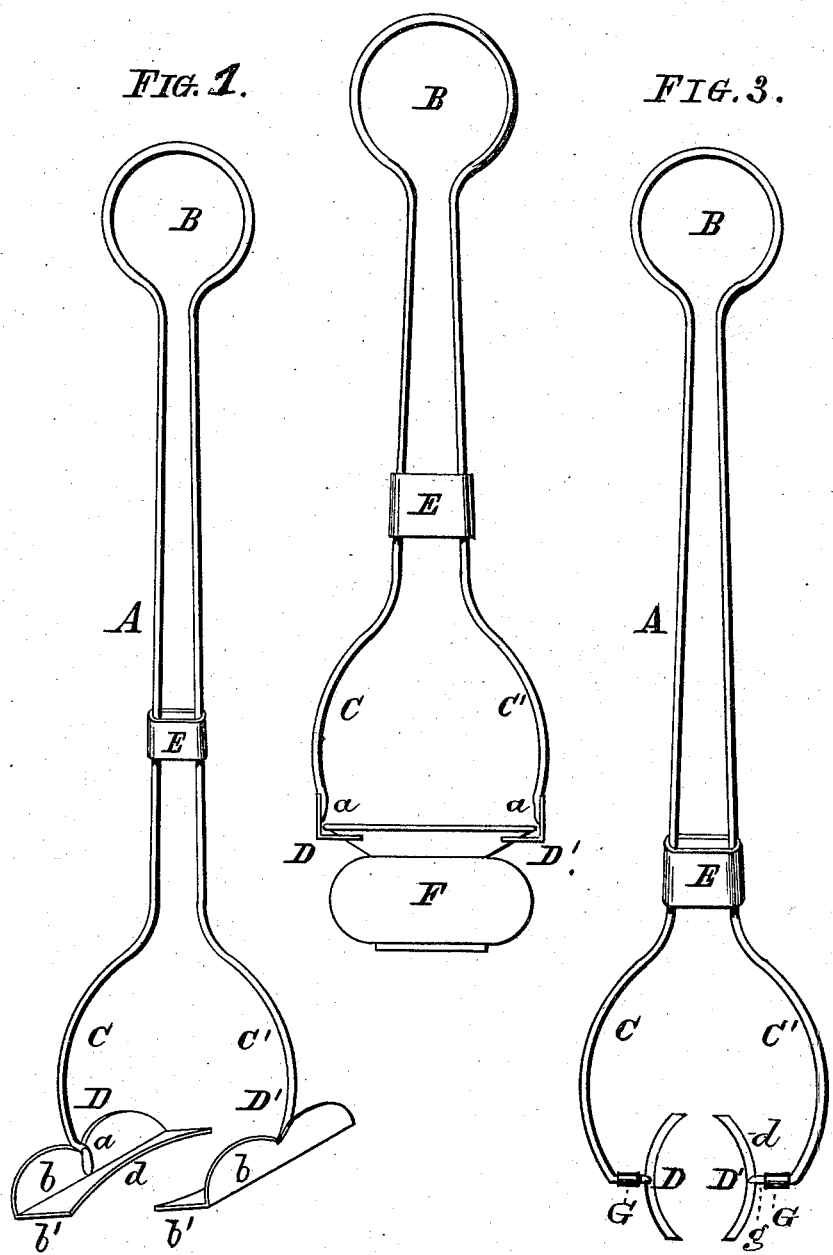
Witnesses:
M. Stark
W. O. Stark
Inventor:
John J. Anthony
by Michael J. Stark,
Attorney.

UNITED STATES PATENT OFFICE.

JOHN J. ANTHONY, OF NIAGARA FALLS, NEW YORK.

SPITTOON-LIFTER.

SPECIFICATION forming part of Letters Patent No. 305,653, dated September 23, 1884.

Application filed August 8, 1884. (No model.)

*To all whom it may concern:*

Be it known that I, JOHN JACOB ANTHONY, of Niagara Falls, in the county of Niagara and State of New York, have invented certain new and useful Improvements on a Spittoon-Lifter; and I do hereby declare that the following description of my said invention, taken in connection with the accompanying sheet of drawings, forms a full, clear, and exact specification, which will enable others skilled in the art to which it appertains to make and use the same.

My present invention has general reference to improvements in spittoon and cuspidor lifters and carriers; and it consists, essentially, in the novel and peculiar combination of parts and details of construction, as hereinafter first fully set forth and described, and then pointed out in the claims.

In the drawings already mentioned, which serve to illustrate my said invention more fully, Figure 1 is a perspective view of my new and improved cuspidor-lifter. Fig. 2 is a side elevation of the same, illustrating the manner of clamping and lifting the spittoon. Fig. 3 is a perspective view of the apparatus, showing a slightly-modified form of the same.

Like parts are designated by corresponding letters of reference in all the figures.

The object of my present invention is the production of a simple and cheap medium for lifting and carrying about spittoons, cuspidors, and other vessels receiving the discharge of spittle. It is a well-known fact that these vessels are usually one of the obnoxious articles for ladies to handle, and our present invention is designed with a special view to enable ladies to carry these vessels for the purpose of cleaning and otherwise.

My new spittoon-carrier consists, essentially, of a bifurcated spring-clamp, A, having on its upper end an "eye," B, to add to the elasticity of the spring-clamp A, and at the same time form a convenient handle by means of which the apparatus may be carried about. The lower ends or extremities of the arms A are preferably flattened, as shown at *a*, Figs. 1 and 2, and to these flattened portions are soldered (or otherwise securely affixed) a pair of clamping jaws or "grips," D D', each consisting of a right-angle piece, *b b'*, of suitable length, the edge of the portion *b'* being curved, as shown in Fig. 1, so as to adapt the grip for embracing the usually circular vessel F, as shown in Fig. 2.

Upon the arms A is placed a slide, E, working loosely upon said arms, the latter being convergingly arranged, so that by sliding the slide downward the jaws D D' will be drawn together, while a movement of the said slide in an opposite direction produces a contrary result. It will now be readily observed that the slide E being moved upward toward the handle B and the jaws D D' extended, nothing remains to be done in order to grip a spittoon but to close the jaws, so as to embrace the said vessel in any suitable manner, when the slide E will immediately drop and cause the jaws to firmly embrace the vessel, when the latter may be carried about by taking hold of the apparatus by the handle B. It will be further observed that the handle B and arms A, being formed integral of, preferably, round spring-wire of suitable diameter, and the jaws D D' formed of sheet metal and soldered or riveted to the flattened portions *a*, this apparatus can be manufactured at but a trifling expense, so that its introduction as a convenient household implement, owing to its low price, can be readily accomplished.

Instead of forming the jaws D D' of sheet metal, as shown in Fig. 1, I may make them of either wire or cast metal, and attach them to the arms C C' either by means of sleeves G G, Fig. 3, or in any other suitable and convenient manner. Such a construction of the apparatus may be found more durable than that shown in Fig. 1, and, being a mechanical equivalent of the same, is a part of my present invention. In fact, I may modify this portion of the grip in various other manners if found advisable and expedient.

Having thus fully described my invention, I claim as new and desire to secure to me by Letters Patent of the United States—

1. A spittoon-lifter consisting, essentially, of a bifurcated portion, A, having the eye or handle B formed integral, a pair of jaws affixed to the curved portion C C' of the fork, and a slide, E, operating upon the bifurcated portion A, the whole being constructed and combined substantially in the manner and for the object specified.

2. In spittoon-lifters, the combination, with the bifurcated spring portion A, of a pair of jaws, D D', affixed to the fork A by means of the sleeves or sockets G, said jaws consisting of a curved portion, d, having centrally a pin, g, entering the sleeve G, substantially as and for the object stated.

3. As a new article of manufacture, a spring-clamping spittoon-lifter having a locking device for the spring-arms, as and for the purpose indicated.

In testimony that I claim the foregoing as my invention I have hereto set my hand in the presence of two subscribing witnesses.

J. J. ANTHONY.

Attest:
ARTHUR D. HAMLIN,
W. J. MACKAY.